United States Patent
Seo et al.

(10) Patent No.: US 10,676,543 B2
(45) Date of Patent: Jun. 9, 2020

(54) MODIFIED CONJUGATED DIENE-BASED POLYMER, METHOD FOR PREPARING THE SAME AND RUBBER COMPOSITION COMPRISING THE SAME

(71) Applicant: LG Chem, Ltd., Seoul (KR)

(72) Inventors: Kyung Chang Seo, Daejeon (KR); No Ma Kim, Daejeon (KR); Sang Mi Lee, Daejeon (KR); Yu Jin Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/766,480

(22) PCT Filed: Jul. 5, 2017

(86) PCT No.: PCT/KR2017/007189
§ 371 (c)(1),
(2) Date: Apr. 6, 2018

(87) PCT Pub. No.: WO2018/030645
PCT Pub. Date: Feb. 15, 2018

(65) Prior Publication Data
US 2019/0153124 A1    May 23, 2019

(30) Foreign Application Priority Data

Aug. 12, 2016 (KR) .................. 10-2016-0103222

(51) Int. Cl.
| | | |
|---|---|---|
| C08C 19/25 | (2006.01) | |
| C08F 236/10 | (2006.01) | |
| C08C 19/44 | (2006.01) | |
| C08F 236/06 | (2006.01) | |
| C08C 19/22 | (2006.01) | |
| C07F 7/18 | (2006.01) | |
| C08L 15/00 | (2006.01) | |
| C08F 4/48 | (2006.01) | |
| C08F 4/50 | (2006.01) | |
| C08F 4/54 | (2006.01) | |
| C08K 5/5419 | (2006.01) | |
| C08K 5/544 | (2006.01) | |
| C08K 3/22 | (2006.01) | |

(52) U.S. Cl.
CPC ............ *C08C 19/25* (2013.01); *C07F 7/1804* (2013.01); *C08C 19/22* (2013.01); *C08C 19/44* (2013.01); *C08F 4/48* (2013.01); *C08F 4/50* (2013.01); *C08F 4/54* (2013.01); *C08F 236/06* (2013.01); *C08F 236/10* (2013.01); *C08K 5/5419* (2013.01); *C08K 5/5442* (2013.01); *C08L 15/00* (2013.01); *C08K 2003/2296* (2013.01)

(58) Field of Classification Search
CPC .......... C08C 19/22; C08C 19/25; C08F 36/06
See application file for complete search history.

(56) References Cited

U.S. PATENT DOCUMENTS

| 4,341,886 A | 7/1982 | Freppel |
| 4,397,994 A | 8/1983 | Takeuchi et al. |
| 5,017,636 A * | 5/1991 | Hattori .................. C08C 19/44 524/300 |
| 5,025,059 A * | 6/1991 | Mouri ................... B60C 1/0016 524/495 |
| 6,017,985 A | 1/2000 | Kang et al. |
| 7,189,792 B2 | 3/2007 | Halasa et al. |
| 7,943,712 B2 | 5/2011 | Halasa et al. |
| 2006/0148964 A1* | 7/2006 | Lasage ............... C08F 297/023 524/495 |
| 2010/0016500 A1 | 1/2010 | Sone et al. |
| 2015/0045474 A1 | 2/2015 | Lee et al. |
| 2016/0177011 A1* | 6/2016 | Kim ..................... B60C 1/0016 524/572 |
| 2016/0208024 A1 | 7/2016 | Kim et al. |
| 2019/0153124 A1 | 5/2019 | Seo et al. |

FOREIGN PATENT DOCUMENTS

| EP | 0434353 A2 | 6/1991 |
| EP | 0874001 A1 | 10/1998 |
| EP | 3345940 A1 | 7/2018 |
| JP | H10310665 A | 11/1998 |
| JP | 2001131230 A | 5/2001 |
| JP | 2005290355 A | 10/2005 |
| JP | 2008106118 A | 5/2008 |
| JP | 2015528050 A | 9/2015 |
| KR | 20060009909 A | 2/2006 |
| KR | 20150044799 A | 4/2015 |
| WO | WO-2015056898 A1 * | 4/2015 |
| WO | 2018030645 A1 | 2/2018 |

OTHER PUBLICATIONS

Search report from International Application No. PCT/KR2017/007189, dated Sep. 25, 2017.
Extended European Search Report including Written Opinion for Application No. EP17839663.6 dated Oct. 24, 2018.
Chinese Search Report for Application No. 201780003695.0 dated Nov. 15, 2019, 2 pages.

* cited by examiner

*Primary Examiner* — Robert C Boyle
(74) *Attorney, Agent, or Firm* — Lerner, David, Littenberg, Krumholz & Mentlik, LLP

(57) ABSTRACT

The present invention relates to a modified conjugated diene-based polymer, a method of preparing the same, and a rubber composition including the same, and more specifically provides a rubber composition which includes a repeating unit derived from a conjugated diene-based monomer having a trans-1,4 bond content of 80 wt % or more and a functional group derived from an alkoxysilane-based modifier, a method of preparing the same, and a rubber composition including the same.

13 Claims, No Drawings

MODIFIED CONJUGATED DIENE-BASED POLYMER, METHOD FOR PREPARING THE SAME AND RUBBER COMPOSITION COMPRISING THE SAME

CROSS-REFERENCE TO RELATED APPLICATION

The present application is a national phase entry under 35 U.S.C. § 315 of International Application No. PCT/KR2017/007189 filed Jul. 5, 2017, which claims priority from Korean Patent Application No. 10-2016-0103222, filed on Aug. 12, 2016, all of which are incorporated herein by reference.

TECHNICAL FIELD

The present invention relates to a modified conjugated diene-based polymer, and more specifically to a modified conjugated diene-based polymer having abrasion resistance improved by increasing a ratio of a trans-1,4 bond content of a conjugated diene-based polymer and having excellent rolling resistance and resistance on wet roads due to modification of a conjugated diene-based polymer, and a method of preparing the same.

BACKGROUND ART

With the demand for low fuel consumption for automobiles in recent years, there has been demand for a conjugated diene-based polymer, as a rubber material for a tire, having low rolling resistance, excellent abrasion resistance and tensile properties, and adjustment stability exemplified by resistance on wet roads.

In order to reduce the rolling resistance of the tire, there is a method of reducing the hysteresis loss of the vulcanized rubber. As the evaluation index of such vulcanized rubber, rebound resilience at 50 to 80° C., tan δ, Goodrich heating or the like are used. That is, a rubber material having high rebound resilience at the above-described temperature or a low tan δ and low Goodrich heating is preferred.

Natural rubbers, polyisoprene rubbers, polybutadiene rubbers, and the like are known as rubber materials having a small hysteresis loss, but these rubbers have low resistance on wet roads. Therefore, recently, a conjugated diene-based polymer or copolymer such as styrene-butadiene rubber (hereinafter referred to as SBR) or butadiene rubber (hereinafter referred to as BR) has been prepared by emulsion polymerization or solution polymerization and used as a rubber for a tire. Among these, the greatest advantage of solution polymerization over emulsion polymerization is that a vinyl structure content and styrene content, which define rubber properties, can be arbitrarily controlled, and a molecular weight and physical properties can be controlled by coupling, modification or the like. Therefore, since it is possible to easily change the structure of the finally prepared SBR or BR, reduce the movement of chain ends by bonding or modification of chain ends, and increase bonding force with a filler such as silica or carbon black, SBR prepared by solution polymerization is widely used as a rubber material for a tire.

When the solution-polymerized SBR is used as a rubber material for a tire, the glass transition temperature of the rubber can be raised by increasing a vinyl content in the SBR such that required properties of a tire such as running resistance and braking force can be controlled. Fuel consumption can also be reduced by suitably controlling the glass transition temperature. The solution-polymerized SBR is prepared by using an anionic polymerization initiator, and chain ends of the polymer formed are bonded or modified by using various modifiers. For example, U.S. Pat. No. 4,397,994 discloses a technique in which an active anion at the chain end of a polymer, obtained by polymerizing styrene-butadiene in a nonpolar solvent using alkyllithium, which is a monofunctional initiator, is bonded using a binder such as a tin compound.

Further, carbon black and silica are used as reinforcing fillers for tire treads. When silica is used as a reinforcing filler, hysteresis loss is low and resistance on wet roads is improved. However, as compared to carbon black having a hydrophobic surface, silica having a hydrophilic surface has a disadvantage in that affinity with rubber is low and dispersibility is poor. Therefore, it is necessary to use a separate silane coupling agent in order to improve the dispersibility or to provide the bond between the silica and the rubber. Thus, a certain method of introducing a functional group having affinity or reactivity with silica to the terminal of the rubber molecule has been proposed, but the effect is insufficient. Further, even when a reinforcing filler is used together with the solution-polymerized SBR, abrasion resistance still does not satisfy the required level.

PRIOR ART DOCUMENT

Patent Literature (Patent literature 1) U.S. Pat. No. 4,397,994 A

DISCLOSURE

Technical Problem

The present invention has been made to solve the above-described problems of the prior art, and the object of the present invention is to provide a modified conjugated diene-based polymer having abrasion resistance improved by increasing a ratio of a trans-1,4 bond content of a conjugated diene-based polymer and having excellent rolling resistance and resistance on wet roads due to modification of a conjugated diene-based polymer, and a method of preparing the same.

Technical Solution

According to an embodiment of the present invention for achieving the objective, the present invention provides a modified conjugated diene-based polymer, which includes a repeating unit derived from a conjugated diene-based monomer having a trans-1,4 bond content of 80 wt % or more, and a functional group derived from an alkoxysilane-based modifier.

Further, the present invention provides a method of preparing a modified conjugated diene-based polymer, which includes: i) polymerizing a conjugated diene-based monomer in the presence of a catalyst composition including an organic alkaline earth metal compound and an organic alkali metal compound to prepare an active polymer including an alkali metal terminal and a repeating unit derived from a conjugated diene-based monomer with a trans-1,4 bond content of 80 wt % or more; and ii) modifying the active polymer by an alkoxysilane-based modifier.

Advantageous Effects

The modified conjugated diene-based polymer according to the present invention has an improved abrasion resistance due to a high ratio of a trans-1,4 bond content in a conjugated diene-based polymer, and has excellent rolling resistance and resistance on wet roads due to a functional group derived from an alkoxysilane-based modifier, and the balance between the physical properties is excellent.

BEST MODE FOR CARRYING OUT THE INVENTION

Hereinafter, the present invention will be described in detail in order to facilitate understanding of the present invention.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

A modified conjugated diene-based polymer of the present invention may include a repeating unit derived from a conjugated diene-based monomer having a trans-1,4 bond content of 80 wt % or more, and a functional group derived from an alkoxysilane-based modifier.

The repeating unit derived from a conjugated diene-based monomer may refer to a repeating unit formed when the conjugated diene-based monomer is polymerized, and for example, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (where halo refers to a halogen atom).

Further, according to an embodiment of the present invention, when the trans-1,4 bond content of the repeating unit derived from a conjugated diene-based monomer is 80 wt % or more, abrasion resistance can be significantly improved, and specific examples of the trans-1,4 bond content include 80 to 99 wt %, 80 to 90 wt %, or 83 to 89 wt %.

The trans-1,4 bond content may refer to a content of a conjugated diene-based monomer forming a trans-1,4-added repeating unit with respect to 100 wt % of 1,4-added repeating units except for 1,2-added repeating units in repeating units derived from a conjugated diene-based monomer of the conjugated diene-based polymer.

According to an embodiment of the present invention, the repeating unit derived from a conjugated diene-based monomer may include a 1,2-added repeating unit at 1 to 50 wt %, 5 to 30 wt %, or 5 to 10 wt %, and 1,4-added repeating unit at 50 to 99 wt %, 70 to 95 wt %, or 90 to 95 wt %, and may have a trans-1,4 bond content of 80 wt %, or more, 80 to 99 wt %, 80 to 90 wt %, or 83 to 89 wt % with respect to 100 wt % of the 1,4-added repeating unit.

Further, the modified conjugated diene-based polymer may be, for example, a copolymer including the repeating unit derived from a conjugated diene-based monomer and a repeating unit derived from an aromatic vinyl monomer.

The repeating unit derived from an aromatic vinyl monomer may refer to a repeating unit formed when the aromatic vinyl monomer is polymerized, and for example, the aromatic vinyl monomer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, and 1-vinyl-5-hexyl naphthalene.

When the modified conjugated diene-based polymer is a copolymer including a repeating unit derived from an aromatic vinyl monomer, the modified conjugated diene-based polymer may include a repeating unit derived from a conjugated diene-based monomer at 50 to 95 wt %, 55 to 90 wt %, or 60 to 90 wt %, and a repeating unit derived from an aromatic vinyl monomer at 5 to 50 wt %, 10 to 45 wt %, or 10 to 40 wt %. Within these ranges, rolling resistance, resistance on wet roads and abrasion resistance can be excellent.

According to an embodiment of the present invention, the copolymer may be a random copolymer, and in this case, the balance between the physical properties is excellent. The random copolymer may refer to a copolymer in which repeating units forming the copolymer are randomly arranged.

The functional group derived from an alkoxysilane-based modifier may refer to a functional group in the polymer produced by the reaction of the active site of the conjugated diene-based polymer with the alkoxysilane-based modifier. The functional group has an effect of improving the dispersibility and processability of the conjugated diene-based polymer and improving the mechanical properties such as rolling resistance, resistance on wet roads, and the like.

The alkoxysilane-based modifier according to an embodiment of the present invention may refer to a compound containing a silane group substituted with an alkoxy group in a molecule, and a specific example thereof includes one or more selected from the group consisting of alkoxysilane-based modifiers represented by the following Formulas 1a to 1z.

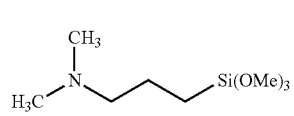 [Formula 1a]

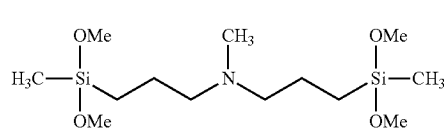 [Formual 1c]

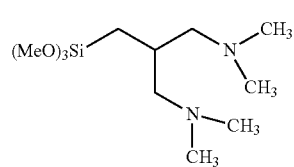 [Formula 1e]

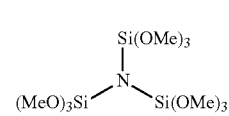 [Formula 1b]

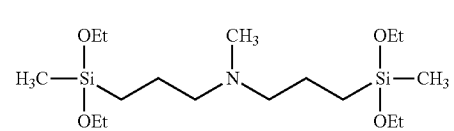 [Formula 1d]

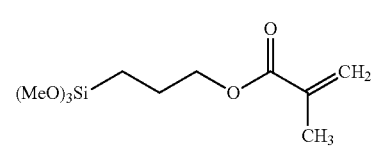 [Formula 1f]

[Formula 1g]
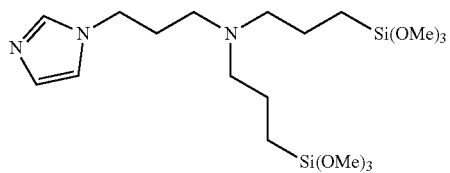
[Formula 1h]
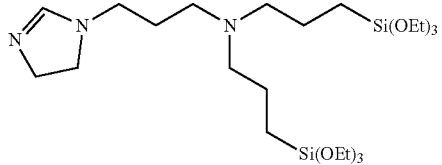
[Formula 1i]
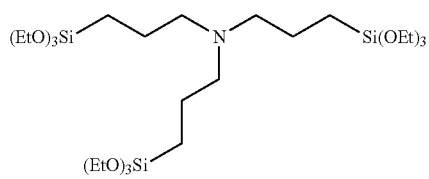
[Formula 1j]
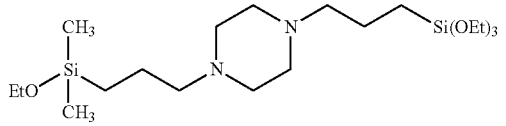
[Formula 1k]
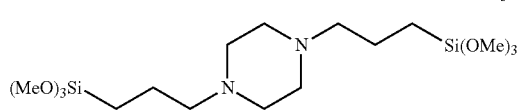
[Formula 1l]
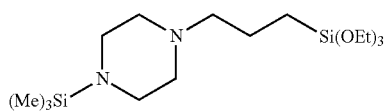
[Formula 1m]
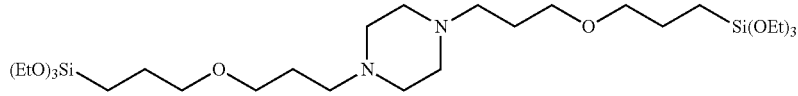
[Formula 1n]
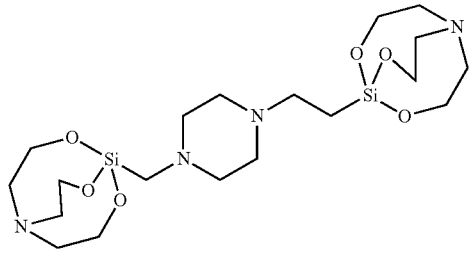
[Formula 1o]
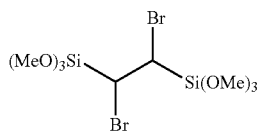
[Formula 1p]
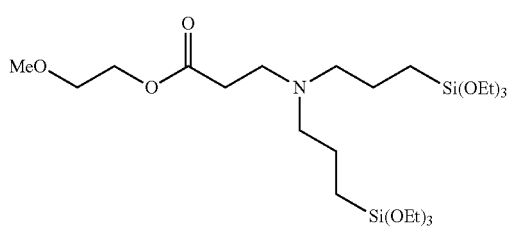
[Formula 1q]
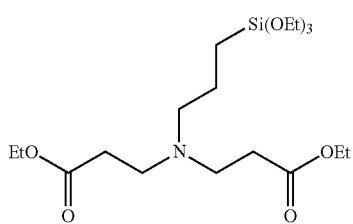
[Formula 1r]
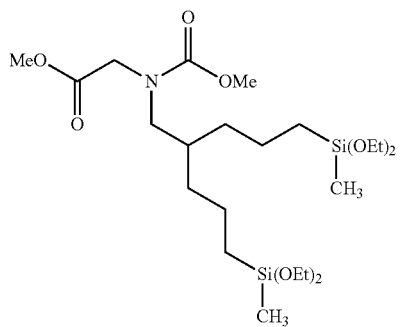
[Formula 1s]
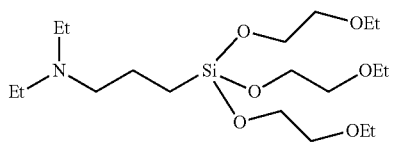

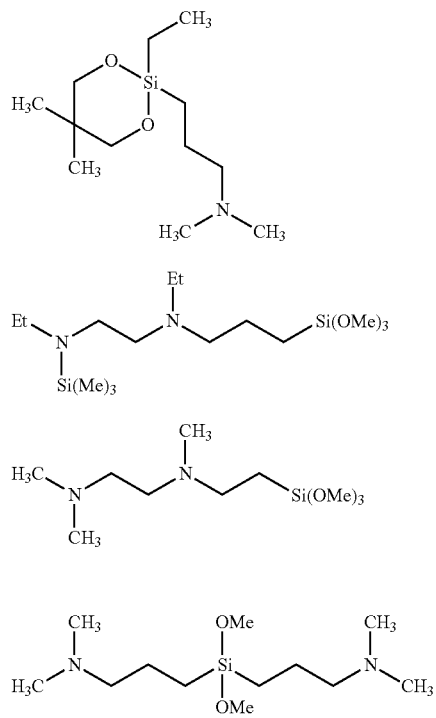
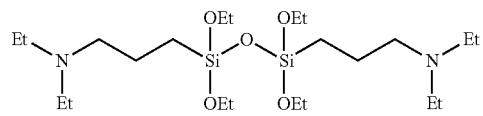
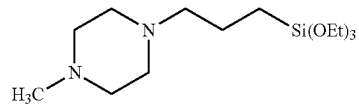
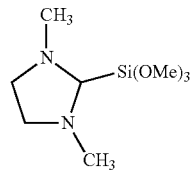
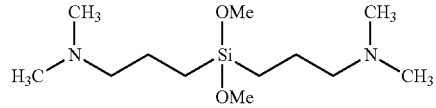

In Formulas 1a to 1z, Me is a methyl group, and Et is an ethyl group. The modified conjugated diene-based polymer according to an embodiment of the present invention may be a terminal modified conjugated diene-based polymer in which the terminal of the conjugated diene-based polymer containing a repeating unit derived from the conjugated diene-based monomer is modified to the functional group derived from an alkoxysilane-based modifier.

Further, when the trans-1,4 bond content of the conjugated diene-based polymer is high, the activity of the active site of the conjugated diene-based polymer is low due to the structural stability of the trans bond, and thus the reaction with the modifier may not be fully conducted, and accordingly the bonding efficiency between the conjugated diene-based polymer and the modifier is low and the effect of improving the physical properties may be insignificant. However, when the alkoxysilane-based modifier is used as in an embodiment of the present invention, the bonding efficiency between the conjugated diene-based polymer and the alkoxysilane-based modifier is excellent. As such, in the modified conjugated diene-based polymer according to an embodiment of the present invention, the bonding efficiency between the conjugated diene-based polymer and the alkoxysilane-based modifier, that is, a modification ratio, may be 50% or more, 60% to 100%, 80% to 95%, or 85% to 95%. Within this range, mechanical properties such as abrasion resistance, rolling resistance, resistance on wet roads, and the like are excellent, and the balance between the physical properties are excellent.

The modified conjugated diene-based polymer according to an embodiment of the present invention may have a number average molecular weight (Mn), in the range of 10,000 g/mol to 500,000 g/mol, 50,000 g/mol to 300,000 g/mol, or 50,000 g/mol to 200,000 g/mol, and have a weight average molecular weight (Mw), in the range of 15,000 g/mol to 1,000,000 g/mol, 150,000 g/mol to 400,000 g/mol, or 150,000 g/mol to 300,000 g/mol. Within these ranges, rolling resistance and resistance on wet roads can be excellent. As another example, the modified conjugated diene-based polymer may have a molecular weight distribution (Mw/Mn) in the range of 1.1 to 3, 1.5 to 2.5, or 1.7 to 2.0, and abrasion resistance can be excellent within this range.

As another example, the modified conjugated diene-based polymer may have a Mooney viscosity in the range of 10 to 100, or 20 to 50, and processability and productivity can be excellent within this range.

The present invention provides a rubber composition including the modified conjugated diene-based polymer.

For example, the rubber composition according to an embodiment of the present invention may include a modified conjugated diene-based polymer at 10 wt % or more, 10 wt % to 100 wt %, or 20 wt % to 90 wt %. Within this range, abrasion resistance, rolling resistance and resistance on wet roads of a molded article manufactured using the rubber composition such as a tire can be excellent.

As another example, the rubber composition may further include other rubber components in addition to the modified conjugated diene-based polymer. Here, the rubber component may be included at 90 wt % or less with respect to the total weight of the rubber composition, and as a specific example, may be included at 1 to 900 parts by weight with respect to 100 parts by weight of the modified conjugated diene-based polymer.

For example, the rubber component may be a natural rubber or a synthetic rubber, and specific examples thereof include a natural rubber (NR) containing cis-1,4-polyisoprene; a modified natural rubber such as an epoxidized natural rubber (ENR), a deproteinized natural rubber (DPNR), a hydrogenated natural rubber or the like obtained by modifying or refining a natural rubber; a synthetic rubber such as a styrene-butadiene copolymer (SBR), polybutadiene (BR), polyisoprene (IR), a butyl rubber (IIR), an ethylene-propylene copolymer, polyisobutylene-co-isoprene, neoprene, poly (ethylene-co-propylene), poly(styrene-co-butadiene), poly (styrene-co-isoprene), poly(styrene-co-isoprene-co-butadiene), poly(isoprene-co-butadiene), poly(ethylene-co-propylene-co-diene), a polysulfide rubber, an acrylic rubber, a urethane rubber, a silicone rubber, an epichlorohydrin rubber, a butyl rubber, a halogenated butyl rubber, and the like, and one or a mixture of two or more thereof may be used.

As another example, the rubber composition may include a filler at 0.1 to 200 parts by weigh with respect to 100 parts by weight of the modified conjugated diene-based polymer. For example, the filler may be a silica-based filler, a carbon black-based filler, or a mixture thereof.

When the silica-based filler is used as the filler, the rubber composition may further include a silane coupling agent for improving the reinforcing property and low exothermic property.

For example, the silane coupling agent may be one or more selected from the group consisting of bis(3-triethoxysilylpropyl) tetrasulfide, bis(3-triethoxysilylpropyl) trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyl tetrasulfide, 3-triethoxysilylpropylbenzoyltetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, dimethoxymethylsilylpropylbenzothiazolyl tetrasulfide, etc.

For example, the silane coupling agent may be included at 1 to 20 parts by weight with respect to 100 parts by weight of the silica-based filler. Within this range, the effect as a coupling agent is sufficiently exhibited, and gelation of the rubber component can be prevented. As another example, the silane coupling agent may be included at 5 to 15 parts by weight with respect to 100 parts by weight of the silica-based filler.

According to an embodiment of the present invention, the rubber composition may be sulfur-crosslinkable, and thus may further include a vulcanizing agent. For example, the vulcanizing agent may be sulfur powder, and may be included at 0.1 to 10 parts by weight with respect to 100 parts by weight of the rubber component. Within this range, the elastic modulus and mechanical strength required for the vulcanized rubber composition are secured, and fuel efficiency is increased.

Further, for example, the rubber composition may include various additives usually used in the rubber industry in addition to the above-mentioned components, and as a specific example, may further include a vulcanizing accelerator, a process oil, a plasticizer, an anti-aging agent, an antioxidant, a scorch inhibitor, zinc oxide (zinc white), stearic acid, a wax, a rubber accelerator, a thermosetting resin, a thermoplastic resin, or the like.

For example, the vulcanizing accelerator may be a thiazole-based compound such as M(2-mercaptobenzothiazole), DM(dibenzothiazyl disulfide), CZ(N-cyclohexyl-2-benzothiazylsulfenamide), and the like, or a guanidine-based compound such as DPG (diphenylguanidine) and the like, and may be included in an amount of 0.1 to 5 parts by weight with respect to 100 parts by weight of the rubber component.

The process oil serves as a softener in the rubber composition, and for example, may be a paraffinic, naphthenic, or aromatic compound. As a specific example, the aromatic process oil may be used considering tensile strength and abrasion resistance, and naphthenic or paraffinic process oil may be used considering hysteresis loss and low temperature characteristics. For example, the process oil may be included in an amount of 100 parts by weight or less with respect to 100 parts by weight of the rubber component. Within this range, deterioration of tensile strength and low exothermic property (low fuel consumption property) of the vulcanized rubber can be prevented.

For example, the anti-aging agent may be N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, a high-temperature condensate of diphenylamine and acetone, or the like, and may be used in an amount of 0.1 to 6 parts by weight with respect to 100 parts by weight of the rubber component.

The rubber composition according to an embodiment of the present invention may be obtained by kneading using a kneader such as a Banbury mixer, a roll, an internal mixer, and the like by the above-described mixing method, and a vulcanization process may be carried out after a molding process.

The present invention provides a molded article and tire produced using the rubber composition. For example, the molded article may include various industrial rubber products such as an anti-vibration rubber, a belt conveyor, a hose and the like, and the tire may include tire components such as a tire tread, an under tread, a sidewall, a carcass coating rubber, a belt coating rubber, a bead filler, a chafer, a bead coating rubber, or the like.

A method of preparing a modified conjugated diene-based polymer according to an embodiment of the present invention includes: i) polymerizing a conjugated diene-based monomer in the presence of a catalyst composition including an organic alkaline earth metal compound and an organic alkali metal compound to prepare an active polymer including an alkali metal terminal and a repeating unit derived from a conjugated diene-based monomer with a trans-1,4 bond content of 80 wt % or more; and ii) modifying the active polymer by an alkoxysilane-based modifier. According to an embodiment of the present invention, for example, polymerization of Step i) may be performed by only including the conjugated diene-based monomer or including both of a conjugated diene-based monomer and an aromatic vinyl monomer. The polymer thus prepared may be a homopolymer or a copolymer of a conjugated diene-based monomer and an aromatic vinyl monomer, and the copolymer may be a random copolymer.

For example, the polymerization of Step i) may be solution polymerization carried out in a hydrocarbon solvent, and the hydrocarbon solvent may be one or more selected from the group consisting of n-pentane, n-hexane, n-heptane, isooctane, cyclohexane, toluene, benzene, xylene, etc.

The catalyst composition including an organic alkaline earth metal compound and an organic alkali metal compound according to an embodiment of the present invention may refer to a catalyst composition for preparing a repeating unit derived from a conjugated diene-based monomer with a high trans-1,4 bond content.

For example, the organic alkaline earth metal compound may be one or more selected from the group consisting of an organic barium compound, an organic strontium compound, and an organic calcium compound, and as another example, may be an alkaline earth metal salt of an aliphatic alcohol having 1 to 30 carbon atoms or an aromatic alcohol having 5 to 30 carbon atoms.

The organic alkaline earth metal compound according to an embodiment of the present invention may be one or more selected from the group consisting of a barium salt of an aliphatic alcohol having 1 to 30 carbon atoms or an aromatic alcohol having 5 to 30 carbon atoms; a strontium salt of an aliphatic alcohol having 1 to 30 carbon atoms or an aromatic alcohol having 5 to 30 carbon atoms; and a calcium salt of an aliphatic alcohol having 1 to 30 carbon atoms or an aromatic alcohol having 5 to 30 carbon atoms.

The aliphatic alcohol having 1 to 30 carbon atoms may be the linear or branched alkyl alcohol having 1 to 30 carbon atoms; the linear or branched alkylene glycol alkyl ether having 1 to 30 carbon atoms; a linear or branched di(alkylene glycol) alkyl ether having 1 to 30 carbon atoms; or a cycloalkyl alcohol having 1 to 30 carbon atoms substituted or unsubstituted with an alkyl group, and may include hetero atoms. As a specific example, the aliphatic alcohol may be one or more selected from the group consisting of di(ethylene glycol) ethyl ether, di(ethylene glycol) propyl ether, di(N,N-dimethylethylene glycol) ethyl ether, di(ethylene glycol) hexyl ether, and menthol, and a specific example of the aromatic alcohol may be thymol.

For example, the organic alkaline earth metal compound may be one or more selected from the group consisting of barium di(ethylene glycol) ethyl ether, barium di(ethylene glycol) propyl ether, barium di(N,N-dimethylethylene glycol) ethyl ether, barium di(ethylene glycol) hexyl ether, barium mentholate, and barium thymolate.

For example, the organic alkaline earth metal compound may be added in an amount of 0.01 to 10 mol, 0.1 to 5 mol, or 0.5 to 1 mol with respect to 1 mol of the organic alkali metal compound.

The organic alkali metal compound may be one or more selected from the group consisting of methyl lithium, ethyl lithium, propyl lithium, n-butyl lithium, s-butyl lithium, t-butyllithium, hexyllithium, n-decyllithium, t-oxyllithium, phenyllithium, 1-naphthyllithium, n-eicosyllithium, 4-butylphenyllithium, 4-tolyllithium, cyclohexyllithium, 3,5-di-n-heptylcyclohexyllithium, 4-cyclopentyllithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropyl amide.

Further, the catalyst composition according to the present invention may further include an organoaluminum compound as a co-catalyst. For example, the organoaluminum compound may be a compound represented by the following Formula 2.

[Formula 2]

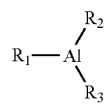

In Formula 2, $R_1$ to $R_3$ each independently represent hydrogen, a linear or branched alkyl group having 1 to 30 carbon atoms, a cycloalkyl group having 5 to 30 carbon atoms, an aryl group having 5 to 30 carbon atoms, an alkylaryl group having 6 to 30 carbon atoms, an arylalkyl group having 6 to 30 carbon atoms, or an alkoxy group having 1 to 30 carbon atoms, and as a specific example, the organoaluminum compound may be one or more selected from the group consisting of diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenylethyl aluminum hydride, phenyl-n-propyl aluminum hydride, p-tolylethyl aluminum hydride, p-tolyl n-propyl aluminum hydride, p-tolyloisopropyl aluminum hydride, benzyl ethyl aluminum hydride, benzyl n-propyl aluminum hydride, benzyl isopropyl aluminum hydride, diethyl aluminum ethoxide, diisobutyl aluminum ethoxide, dipropyl aluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethylphenyl aluminum, diethyl p-tolyl aluminum and diethyl benzyl aluminum.

For example, the organoaluminum compound may be introduced in an amount of 0.1 to 10 mol, 0.5 to 5 mol, or 1 to 2 mol with respect to 1 mol of the organic alkali metal compound.

For example, the polymerization of Step i) according to the present invention may be performed by including a polar additive. The polar additive serves to promote the polymerization reaction and increase the polymerization efficiency, and particularly, when the conjugated diene-based monomer and the aromatic vinyl monomer are copolymerized, a random copolymer may be easily formed by compensating the difference in the reaction rates thereof. As a specific example, the polar additive may be one or more selected from the group consisting of tetrahydrofuran, ditetrahydrofuryl propane, diethyl ether, cycloamylether, dipropyl ether, ethylene dimethyl ether, ethylene dimethyl ether, diethyl glycol, dimethyl ether, tert-butoxyethoxyethane, bis(3-dimethylaminoethyl) ether, (dimethylaminoethyl) ethyl ether, trimethylamine, triethylamine, tripropylamine, and tetramethylethylenediamine, and as another example, may be included at 0.001 to 10 parts by weight, or 0.005 to 0.1 parts by weight with respect to 100 parts by weight of the conjugated diene-based monomer; or a mixture of the conjugated diene-based monomer and the aromatic vinyl monomer.

Further, the polymerization of Step i) may be performed at a polymerization temperature of 20 to 120° C., 40 to 100° C., or 60 to 90° C.

An active polymer prepared by the polymerization of Step i) according to an embodiment of the present invention may be an active polymer having an alkali metal terminal for reaction with an alkoxysilane-based modifier, that is, an active terminal site.

The modification in Step ii) according to an embodiment of the present invention may be performed by reacting the active polymer prepared and the alkoxysilane-based modifier in Step i). The alkali metal terminal of the active polymer is modified by using the alkoxysilane-based modifier through the reaction, and thereby a modified conjugated diene-based polymer including a functional group derived from an alkoxysilane-based modifier in at least one terminal.

Further, the modification in Step ii) may be performed within a temperature range of 10 to 120° C. for 10 minutes to 5 hours.

Modes of the Invention

Now, the present invention will be described in more detail with reference to the following examples. These examples are provided only for illustration of the present invention and should not be construed as limiting the scope and spirit of the present invention.

EXAMPLES

Example 1

1.3 ml of barium di(ethylene glycol) ethyl ether (30 wt % ethylbenzene solution), 6.7 ml of trioctyl aluminum (25 wt % hexane solution), and 1 ml of n-butyllithium (2.5M hexane solution) were mixed to prepare a catalyst composition for polymerization. 19.7 g of styrene, 77.9 g of 1,3-butadiene, and 500 g of n-hexane were placed in a 2 L high-pressure reactor, and an internal temperature of the reactor was adjusted to 90° C. When the internal temperature of the reactor reached 90° C., the catalyst composition was fed into the reactor to proceed the reaction. When the polymerization conversion rate of the polymerization reached 90%, the reaction was terminated to prepare a styrene-butadiene random copolymer having a lithium active site at the terminal.

0.4 g of the alkoxysilane-based modifier represented by the following Formula 1g was added to the obtained copolymer, and the reaction was allowed to proceed at 80° C. for 30 minutes. Thereafter, the reaction was stopped using isopropyl alcohol to prepare a modified conjugated diene-based polymer.

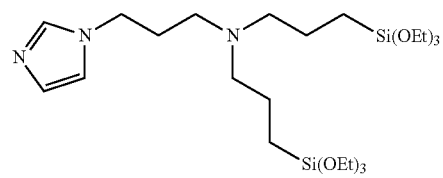

[Formula 1g]

Example 2

A process was performed in the same manner as in Example 1, except that an alkoxysilane-based modifier represented by the following Formula 1u was used.

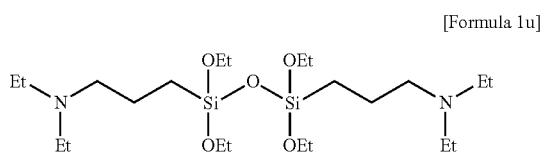 [SMILES: CCO[Si](CCCN(CC)CC)(OCC)O[Si](CCCN(CC)CC)(OCC)OCC]

[Formula 1u]

Example 3

A process was performed in the same manner as in Example 1, except that 0.2 g of tetramethylethylenediamine was added together with styrene, 1,3-butadiene, and n-hexane as a polar additive in the reactor.

Comparative Example 1

A process was performed in the same manner as in Example 1, except that the styrene-butadiene random copolymer was not modified by an alkoxysilane-based modifier.

Comparative Example 2

20 g of styrene, 80 g of 1,3-butadiene, 500 g of n-hexane and 0.2 g of tetramethylethylenediamine as a polar additive were placed in a 2 L high-pressure reactor, and an internal temperature of the reactor was adjusted to 50° C. When the internal temperature of the reactor reached 50° C., 1 ml of n-butyllithium (2.5M hexane solution) was fed into the reactor to start the reaction. When the polymerization conversion rate of the polymerization reached 98%, the reaction was terminated to prepare a styrene-butadiene random copolymer having a lithium active site at the terminal.

0.4 g of the alkoxysilane-based modifier represented by the following Formula 1g was added to the obtained copolymer, and the reaction was allowed to proceed at 80° C. for 10 minutes. Thereafter, the reaction was stopped using isopropyl alcohol to prepare a modified conjugated diene-based polymer.

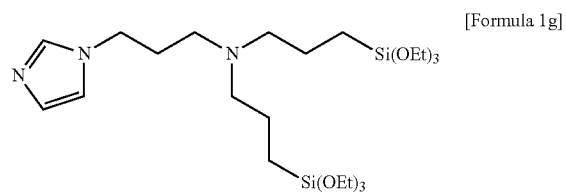

[Formula 1g]

Comparative Example 3

A process was performed in the same manner as in Example 1, except that N-vinyl-2-pyrrolidone was used instead of the alkoxysilane-based modifier.

Comparative Example 4

A process was performed in the same manner as in Example 1, except that N-methyl-2-ε-caprolactam was used instead of the alkoxysilane-based modifier.

Experimental Example 1

The trans-1,4 bond content, the weight average molecular weight (Mw), the number average molecular weight (Mn), molecular weight distribution (Mw/Mn), modification ratio, and Mooney viscosity of each styrene-butadiene copolymer of examples and comparative examples were measured, and the results are shown in Table 1.

1) Trans-1,4 Bond Content (wt %)

The trans-1,4 bond content of 1,4-added butadiene repeating units in each copolymer was measured by 13C-NMR using Bruker AVANCE III HD 500 MHz NMR (BBO Prodigy Cryo probe). Tetrachloroethane-d2 was used as a solvent.

2) Analysis of Molecular Weight

The weight average molecular weight (Mw) and number average molecular weight (Mn) of each copolymer were measured under the condition of 40° C. by gel permeation chromatograph (GPC) analysis. Here, two columns of PLgel Olexis from Polymer Laboratories and one column of PLgel mixed-C column were used in combination. All newly replaced columns were mixed bed-type columns Further, polystyrene (PS) was used as a standard material for GPC in the molecular weight calculation. The ratio of the weight average molecular weight and the number average molecular weight measured by the above-described method was calculated, and the calculated value was rounded off to the second decimal place to represent the molecular weight distribution (Mw/Mn).

3) Modification Ratio (%)

The modification ratio was measured by HPLC using a solvent-gradient method using an 1290 infinity LC manufactured by Agilent Technologies Inc.

4) Mooney Viscosity (ML1+4 @100° C.)

A rubber specimen having a weight of 30 g was preheated for 1 minute, and then the Mooney viscosity was measured at 100° C. for 4 minutes using a MV-2000 manufactured by Alpha Technologies Inc.

TABLE 1

| Classification | Examples | | | Comparative Examples | | | |
|---|---|---|---|---|---|---|---|
| | 1 | 2 | 3 | 1 | 2 | 3 | 4 |
| Trans-1,4 bond content | 86 | 83 | 89 | 87 | 56 | 88 | 91 |
| Mw | 218,855 | 211,143 | 178,361 | 221,593 | 246,800 | 204,278 | 190,789 |
| Mn | 113,987 | 109,401 | 87,432 | 120,431 | 154,329 | 101,128 | 98,345 |
| Mw/Mn | 1.9 | 1.9 | 2.0 | 1.8 | 1.6 | 2.0 | 1.9 |
| Modification ratio | 93 | 95 | 90 | — | 92 | 78 | 81 |
| Mooney viscosity | 26 | 25 | 20 | 26 | 31 | 21 | 21 |

As shown in Table 1, it was confirmed that Examples 1 to 3 prepared according to the present invention had a higher trans-1,4 bond content than Comparative Example 2 in which only n-butyllithium was used as an initiator, and had a higher modification ratio than Comparative Examples 3 and 4 in which a nonsilane-based modifier was used.

Experimental Example 2

Rubber specimens for measuring the physical properties of the rubber compositions including each modified or unmodified styrene-butadiene copolymer of the examples and comparative examples and the molded articles prepared therefrom were prepared. Abrasion resistance, rolling resistance, and resistance on wet roads were measured, and the results are shown in the following Table 2.

1) Preparation of Rubber Specimen

Modified or unmodified styrene-butadiene copolymers of examples and comparative examples as rubber raw materials each were mixed under mixing conditions shown in the following Table 2. The raw materials in Table 2 represent each part by weight based on 100 parts by weight of the rubber.

TABLE 2

| Classification | Raw material | Content (parts by weight) |
|---|---|---|
| Primary kneading | Rubber | 100 |
| | Silica | 70 |
| | Coupling agent | 11.2 |
| | Process oil | 5 |
| | Zinc oxide | 3 |
| | Stearic acid | 2 |
| | Antioxidant | 2 |
| | Anti-aging agent | 2 |
| | Wax | 1 |
| | Rubber accelerator | 1.75 |

TABLE 2-continued

| Classification | Raw material | Content (parts by weight) |
|---|---|---|
| Secondary kneading | Sulfur | 1.5 |
| | Vulcanization accelerator | 2 |

Specifically, the rubber specimens are kneaded by primary kneading and secondary kneading. In primary kneading a rubber raw material (styrene-butadiene copolymer), a filler, an organosilane coupling agent, a process oil, zinc oxide, a stearic acid, an antioxidant, an anti-aging agent, a wax, and accelerators were primarily kneaded using a Banbury mixer equipped with a temperature controller. At this time, the temperature of the kneader was controlled as 150° C. and a primary mixture was obtained at a discharge temperature of 145 to 155° C. In secondary kneading, after the primary mixture was cooled to room temperature, the primary mixture, sulfur and a vulcanization accelerator were added to the kneader and mixed at a temperature of 100° C. or less to obtain a secondary mixture. Thereafter, a curing process was performed at 100° C. for 20 minutes to prepare a rubber specimen.

2) Abrasion Resistance (DIN Loss Weight)

For the abrasion resistance of the prepared rubber specimen, a load of 10 N was applied to a rotating drum to which a wear paper was attached, the rubber specimen was moved in the direction perpendicular to the rotational direction of the drum, and then the abraded amount was measured using a DIN abrasion tester. The rotational speed of the drum was 40 rpm, and the total movement distance of the specimen at the completion of the test was 40 m.

3) Rolling Resistance and Resistance on Wet Roads (Viscoelastic Properties)

The viscoelastic properties of the prepared rubber specimens were measured using a dynamic mechanical analyzer from TA Corporation under a twist mode at a frequency of 10 Hz and at each measurement temperature (−60 to 60° C.). The higher the value of tan δ at 0° C. is, the better the resistance on wet roads is, and the lower the value of tan δ at 60° C. of high temperature, the less the hysteresis loss and the better the rolling resistance is, that is, the better the low fuel consumption property is.

TABLE 3

| Classification | Example | | | Comparative Example | | | |
|---|---|---|---|---|---|---|---|
| | 1 | 2 | 3 | 1 | 2 | 3 | 4 |
| DIN loss weight (mg) | 141 | 138 | 143 | 139 | 167 | 148 | 144 |
| Tan δ at 0° C. | 0.682 | 0.703 | 0.694 | 0.633 | 0.687 | 0.655 | 0.660 |
| Tan δ at 60° C. | 0.161 | 0.152 | 0.154 | 0.196 | 0.155 | 0.177 | 0.169 |

As shown in Table 3, it was confirmed that, in the case of Examples 1 to 3 prepared according to the present invention, all the abrasion resistance, the resistance on wet roads, and the rolling resistance were excellent, and the balance between the physical properties was excellent.

Meanwhile, it was confirmed that, in the case of Comparative Example 1 which was not modified by an alkoxysilane-based modifier, the resistance on wet roads and rolling resistance were very poor, and in the case of Comparative Example 2 in which the trans-1,4 bond content in the copolymer was low while the alkoxysilane-based modifier was used, abrasion resistance was significantly lowered. Also, in the case of Comparative Examples 3 and 4 in which a nonsilane-based modifier was used, it was confirmed that all the abrasion resistance, the resistance on wet roads, and the rolling resistance were poor.

It can be seen from the results that a modified conjugated diene-based polymer, of which the abrasion resistance is remarkably improved by increasing the trans-1,4 bond content of the repeating unit derived from the conjugated diene-based monomer in the copolymer, and of which rolling resistance and resistance on wet roads are enhanced by securing the same or higher modification rate as the solution-polymerized SBR having a low trans-1,4 bond content by modifying the copolymer using an alkoxysilane-based modifier, and of which the balance between the physical properties is excellent, can be realized.

The invention claimed is:

1. A modified conjugated diene-based polymer, comprising a repeating unit derived from a conjugated diene-based monomer having a trans-1,4 bond content of 80 wt % or more, and a functional group derived from an alkoxysilane-based modifier,
wherein the modified conjugated diene-based polymer includes a repeating unit derived from an aromatic vinyl monomer,
wherein the alkoxysilane-based modifier is one or more selected from the group consisting of alkoxysilane-based modifiers represented by the following Formulas 1b to 1r, and 1t to 1y:

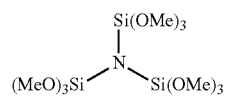

[Formula 1b]

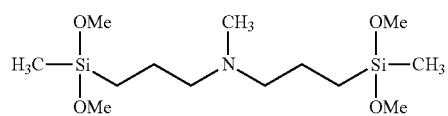

[Formual 1c]

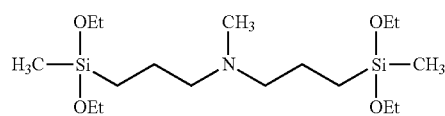

[Formula 1d]

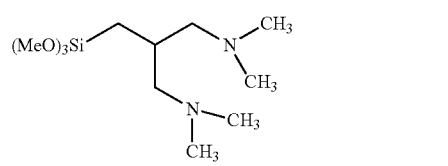

[Formula 1e]

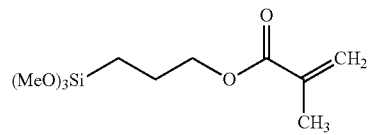

[Formula 1f]

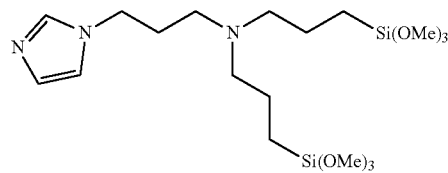

[Formula 1g]

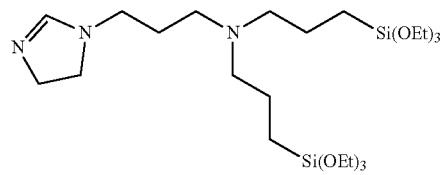

[Formula 1h]

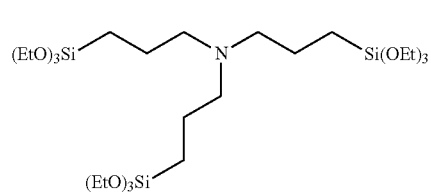

[Formula 1i]

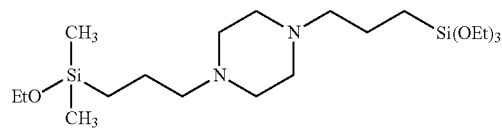

[Formula 1j]

-continued
[Formula 1k]
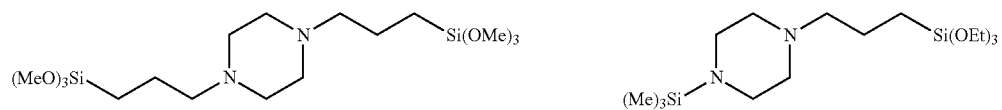
[Formula 1l]
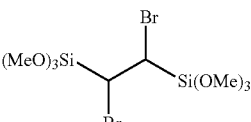
[Formula 1m]
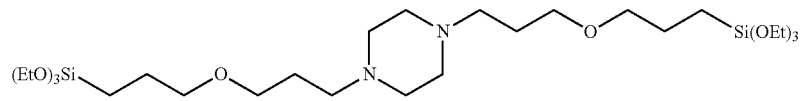
[Formula 1n]
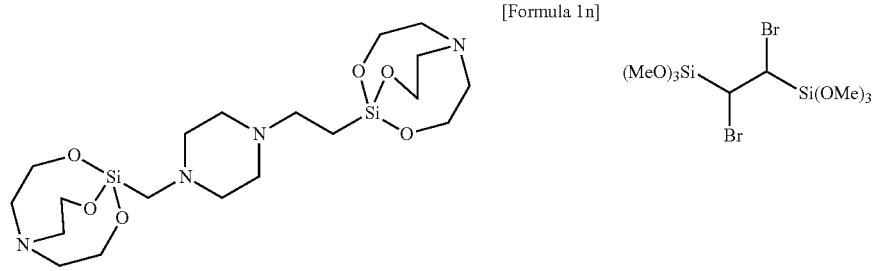
[Formula 1o]
[Formula 1p]
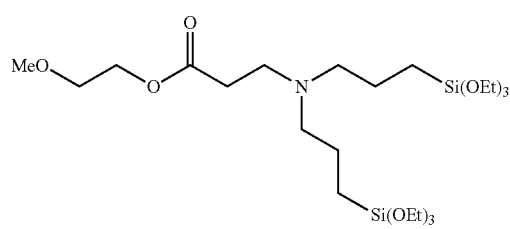
[Formula 1q]
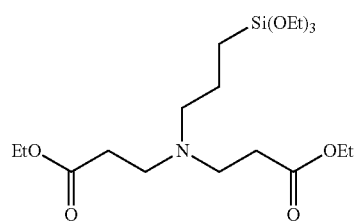
[Formula 1r]
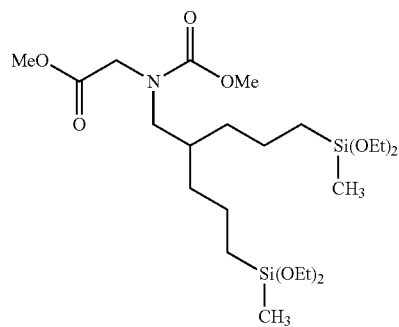
[Formula 1t]
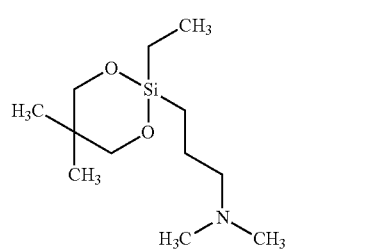
[Formula 1u]
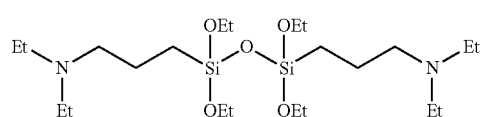
[Formula 1v]
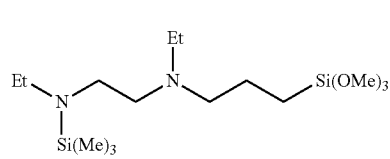
[Formula 1w]
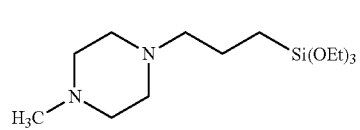

[Formula 1x]

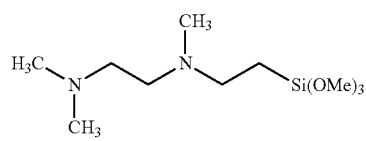

[Formula 1y]

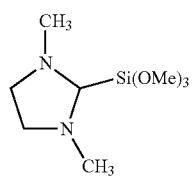

in Formulas 1b to 1r, and 1t to 1y, Me is a methyl group, and Et is an ethyl group.

2. The modified conjugated diene-based polymer according to claim 1, wherein the modified conjugated diene-based polymer is a random copolymer including the repeating unit derived from a conjugated diene-based monomer at 50 to 95 wt % and the repeating unit derived from an aromatic vinyl monomer at 5 to 50 wt %.

3. The modified conjugated diene-based polymer according to claim 1, wherein the modified conjugated diene-based polymer is a terminal modified conjugated diene-based polymer.

4. The modified conjugated diene-based polymer according to claim 1, wherein the modified conjugated diene-based polymer has a number average molecular weight (Mn) in a range of 10,000 to 500,000 g/mol and a molecular weight distribution (Mw/Mn) in a range of 1.1 to 3.

5. A method of preparing a modified conjugated diene-based polymer, comprising:
i) polymerizing a conjugated diene-based monomer and an aromatic vinyl monomer in the presence of a catalyst composition including an organic alkaline earth metal compound and an organic alkali metal compound to prepare an active polymer including an alkali metal terminal and a repeating unit derived from a conjugated diene-based monomer with a trans-1,4 bond content of 80 wt % or more; and
ii) modifying the active polymer by an alkoxysilane-based modifier,
wherein the alkoxysilane-based modifier is one or more selected from the group consisting of alkoxysilane-based modifiers represented by the following Formulas 1b to 1r, and 1t to 1y:

[Formula 1b]

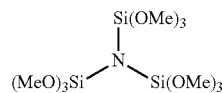

[Formula 1c]

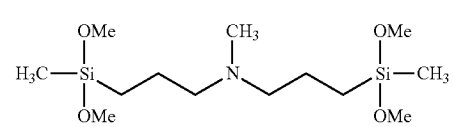

[Formula 1d]

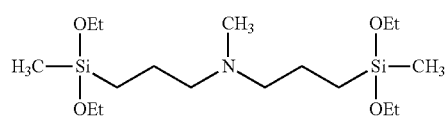

[Formula 1e]

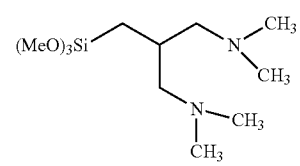

[Formula 1f]

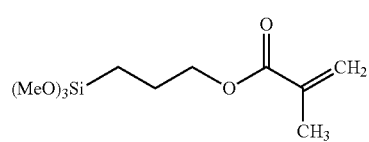

[Formula 1g]

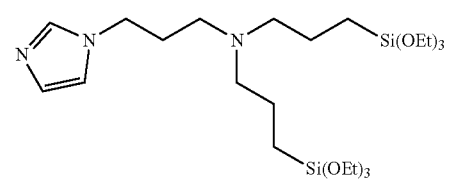

[Formula 1h]

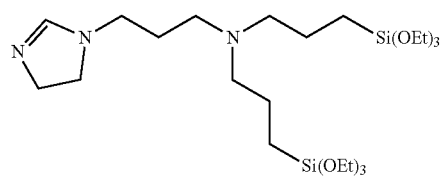

[Formula 1i]

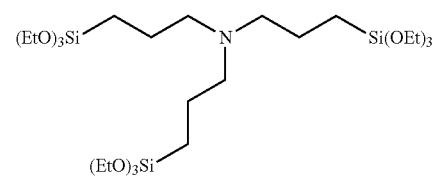

[Formula 1j]

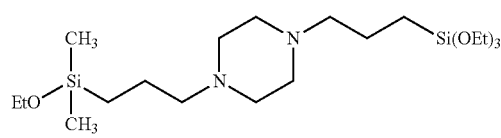

[Formula 1k]

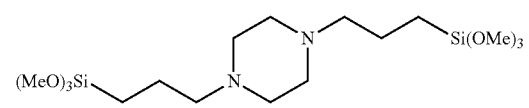

[Formula 1l]

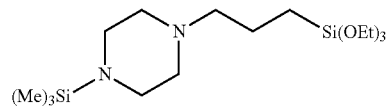

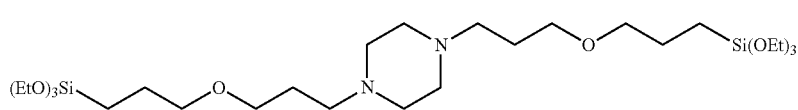
[Formula 1m]

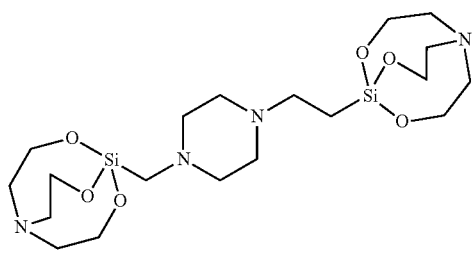
[Formula 1n]

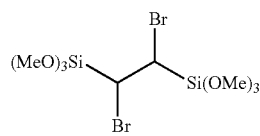
[Formula 1o]

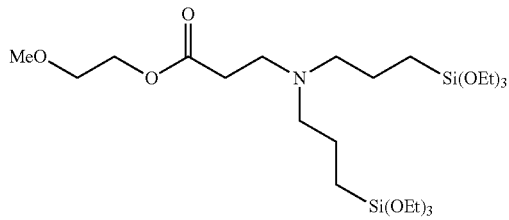
[Formula 1p]

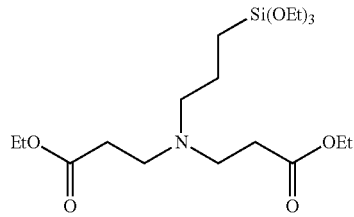
[Formula 1q]

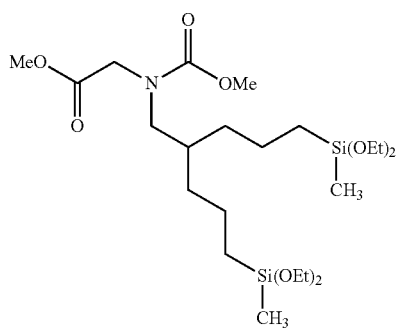
[Formula 1r]

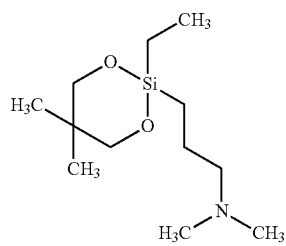
[Formula 1t]

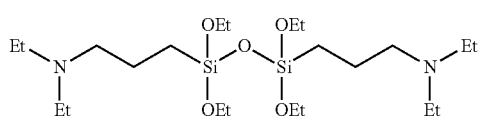
[Formula 1u]

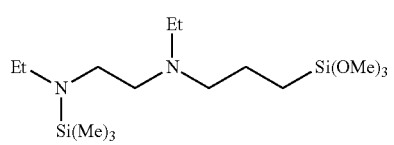
[Formula 1v]

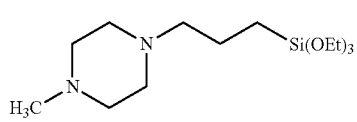
[Formula 1w]

[Formula 1x]

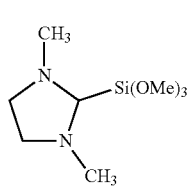
[Formula 1y]

in Formulas 1b to 1r, and 1t to 1y, Me is a methyl group, and Et is an ethyl group.

6. The method according to claim 5, wherein a modification ratio of the modified conjugated diene-based polymer is 50% or more.

7. The method of claim 5, wherein the organic alkaline earth metal compound is one or more selected from the group consisting of a barium salt of an aliphatic alcohol having 1 to 30 carbon atoms or an aromatic alcohol having 5 to 30 carbon atoms; a strontium salt of an aliphatic alcohol having 1 to 30 carbon atoms or an aromatic alcohol having 5 to 30 carbon atoms; and a calcium salt of an aliphatic alcohol having 1 to 30 carbon atoms or an aromatic alcohol having 5 to 30 carbon atoms.

8. The method of claim 7, wherein the organic alkaline earth metal compound is one or more selected from the group consisting of barium di(ethylene glycol) ethyl ether, barium di(ethylene glycol) propyl ether, barium di(N,N-dimethylethylene glycol) ethyl ether, barium di(ethylene glycol) hexyl ether, barium mentholate and barium thymolate.

9. The method of claim 5, wherein the organic alkali metal compound is one or more selected from the group consisting of methyl lithium, ethyl lithium, propyl lithium, n-butyl lithium, s-butyl lithium, t-butyllithium, hexyllithium, n-decyllithium, t-oxyllithium, phenyllithium, 1-naphthyllithium, n-eicosyllithium, 4-butylphenyllithium, 4-tolylithium, cyclohexyllithium, 3,5-di-n-heptylcyclohexyllithium, 4-cyclopentyllithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide and lithium isopropylamide.

10. The method of claim 5, wherein the catalyst composition includes an organoaluminum compound represented by the following Formula 2:

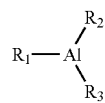

[Formula 2]

in Formula 2, $R_1$ to $R_3$ each independently represent hydrogen, a linear or branched alkyl group having 1 to 30 carbon atoms, a cycloalkyl group having 5 to 30 carbon atoms, an aryl group having 5 to 30 carbon atoms, an alkylaryl group having 6 to 30 carbon atoms, an arylalkyl group having 6 to 30 carbon atoms, or an alkoxy group having 1 to 30 carbon atoms.

11. The method of claim 10, wherein the organoaluminum compound is one or more selected from the group consisting of diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenylethyl aluminum hydride, phenyl-n-propyl aluminum hydride, p-tolylethyl aluminum hydride, p-tolyl n-propyl aluminum hydride, p-tolylisopropyl aluminum hydride, benzyl ethyl aluminum hydride, benzyl n-propyl aluminum hydride, benzyl isopropyl aluminum hydride, diethyl aluminum ethoxide, diisobutyl aluminum ethoxide, dipropyl aluminum methoxide, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethylphenyl aluminum, diethyl p-tolyl aluminum and diethyl benzyl aluminum.

12. The method of claim 5, wherein the polymerization of Step i) is performed by including a polar additive.

13. The method of claim 12, wherein the polar additive is one or more selected from the group consisting of tetrahydrofuran, ditetrahydrofuryl propane, diethyl ether, cycloamylether, dipropyl ether, ethylene dimethyl ether, diethyl glycol, dimethyl ether, tert-butoxyethoxyethane, bis (3-dimethylaminoethyl) ether, (dimethylaminoethyl) ethyl ether, trimethylamine, triethylamine, tripropylamine and tetramethylethylenediamine.

* * * * *